United States Patent
Son

(10) Patent No.: US 8,558,404 B2
(45) Date of Patent: Oct. 15, 2013

(54) SMART SHIP

(76) Inventor: Sung-Chul Son, Paju (KR)

(*) Notice: Subject to any disclaimer, the term of this patent is extended or adjusted under 35 U.S.C. 154(b) by 452 days.

(21) Appl. No.: 12/812,623

(22) PCT Filed: Mar. 31, 2010

(86) PCT No.: PCT/KR2010/001962
§ 371 (c)(1),
(2), (4) Date: Jul. 13, 2010

(87) PCT Pub. No.: WO2011/034268
PCT Pub. Date: Mar. 24, 2011

(65) Prior Publication Data
US 2011/0163549 A1 Jul. 7, 2011

(30) Foreign Application Priority Data
Sep. 16, 2009 (KR) .................... 20-2009-0012142 U

(51) Int. Cl.
*F03D 9/00* (2006.01)
(52) U.S. Cl.
USPC ................................................ 290/55
(58) Field of Classification Search
USPC .................. 290/43–44, 54–55, 50, 52
See application file for complete search history.

(56) References Cited

U.S. PATENT DOCUMENTS

| | | | | |
|---|---|---|---|---|
| 4,256,971 A * | 3/1981 | Griffith | ........................... | 290/53 |
| 4,858,434 A * | 8/1989 | Masuda | ........................... | 60/398 |
| 7,400,057 B2 * | 7/2008 | Sureshan | ........................... | 290/55 |
| 2010/0102561 A1 * | 4/2010 | Zoda | ............................... | 290/50 |
| 2010/0207389 A1 * | 8/2010 | Nyffenegger | ................... | 290/44 |
| 2011/0037261 A1 * | 2/2011 | Champ et al. | ................... | 290/44 |

OTHER PUBLICATIONS

KR 10-2005-0012110 A (Cheong, Kyeong Kyun) Jan. 31, 2005 ( computer Translation).*

* cited by examiner

*Primary Examiner* — Jean F Duverne
(74) *Attorney, Agent, or Firm* — Robert E. Bushnell, Esq.

(57) ABSTRACT

The present invention relates to a smart ship, and in particular to a smart ship which makes it possible to enhance a sailing efficiency of a ship by minimizing an air resistance occurring due to a cross wind when a ship sails while generating an electric power by using a cross wind which power can be used for sailing or for an internal use of a ship. The smart ship of the present invention is equipped with a cross wind power generator for thereby effectively preventing a cross wind resistance and generating an electric power by using a cross wind, so the generated electric power can be used for sailing a ship and for an internal use of a ship, by means of which it is possible to enhance a sailing efficiency of a ship.

3 Claims, 3 Drawing Sheets

SMART SHIP

CLAIM OF PRIORITY

This application makes reference to, incorporates the same herein, and claims all benefits accruing under Title 35 U.S. Code §365(b)(c) of my PCT International application entitled SMART SHIP filed on 31 Mar. 2010 and duly assigned Serial No. PCT/KR2010/001962.

TECHNICAL FIELD

The present invention relates to a smart ship, and in particular to a smart ship which makes it possible to enhance a sailing efficiency of a ship by minimizing an air resistance occurring due to a cross wind when a ship sails while generating an electric power by using a cross wind which power can be used for sailing or for an internal use of a ship with the help of a cross wind power generator in a large size ship or a super large size ship such as an oil tanker or a gas carrier, a container ship, a bulk carrier and an aircraft carrier.

BACKGROUND ART

A ship is made in a streamline shape in her bow and stern portions for thereby minimizing an external air resistance or a strong sea wind resistance, by which the ship can sail faster.

Since the ship is made in a streamline shape in her bow and stern portions, the ship can sail faster without any resistances such as sea wind in her bow and stern portions. However the ship does not have any means for minimizing a cross wind resistance in the course of sailing.

In case of a large size ship or a super large size ship such as an oil tanker or a gas carrier, a container carrier, a bulk carrier and an aircraft carrier which has more than 40~80 m wide, 300~460 m long and 10~30 capacity tonnage, the area exposed from her side surface is very large, so the ship has a relatively larger cross wind resistance in the course of sailing, whereby a lot of a sailing energy loses, and a sailing might be slowed down.

Since a conventional ship is made in a streamline shape only in her bow and stern portions, the ship has a lot of wind resistance. As described above, in case of a large size ship or a super large size ship such as an oil tanker or a gas carrier, a container carrier, a bulk carrier and an aircraft carrier which has more than 40~80 m wide, 300~460 m long and 10~30 capacity tonnage, the ship has a relatively larger cross wind resistance in the course of sailing, by means of which a lot of a sailing energy loses, and a sailing might be slowed down.

DISCLOSURE OF THE INVENTION

Accordingly, it is an object of the present invention to provide a smart ship which can prevent a sailing energy loss as compared to a conventional ship which does not have any means for minimizing a cross wind in the course of sailing.

To achieve the above object, there is provided a smart ship which makes it possible to minimize a sailing resistance due to a cross wind in the course of sailing.

EFFECTS

In the present invention, a cross wind power generator is provided in a ship for thereby preventing a cross wind resistance and generating an electric power by using a cross wind. So the generated electric power can be used for enhancing a sailing force and can be used as an internal voltage. The sailing efficiency of the ship can be significantly enhanced.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
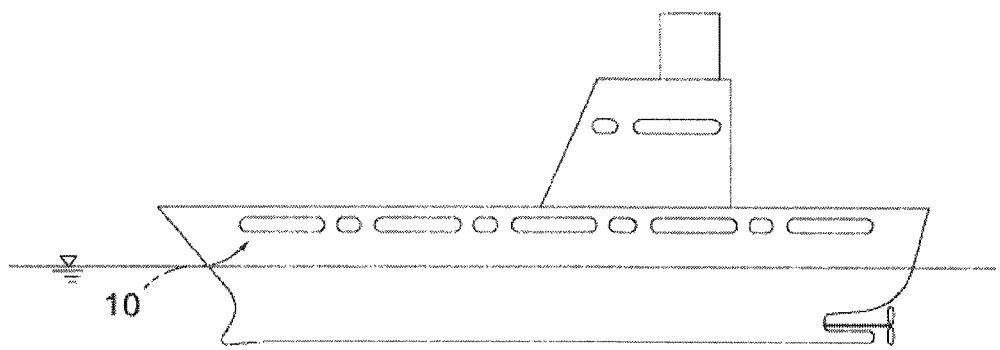
FIG. 1 is a view of an embodiment of the present invention.
Figure 2:
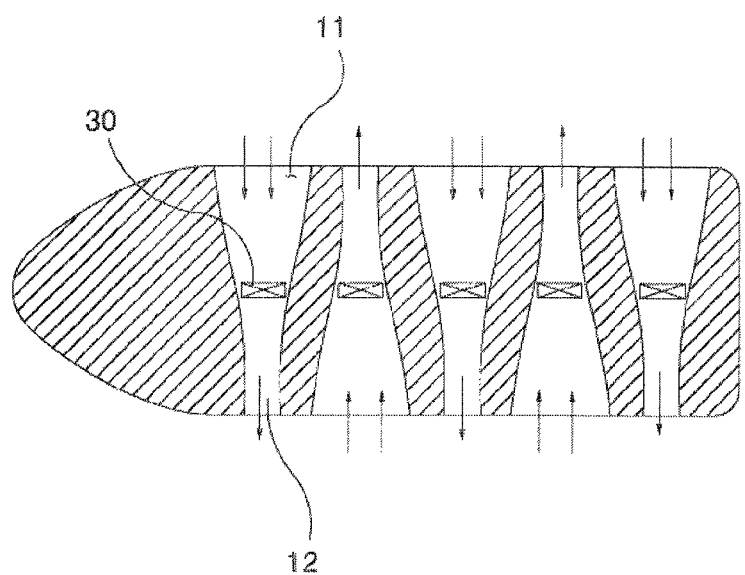
FIG. 2 is a view of a power generation air flow path according to the present invention.
Figure 3:
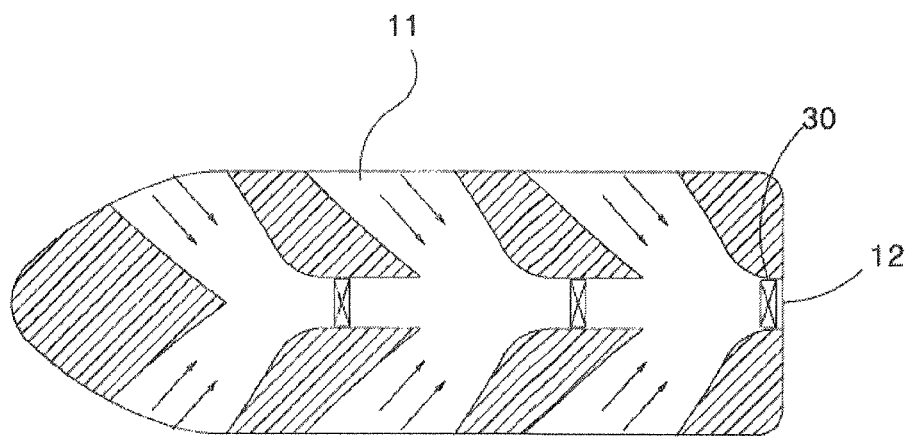
FIG. 3 is a view of another example of a power generation air flow path according to the present invention.
Figure 4:
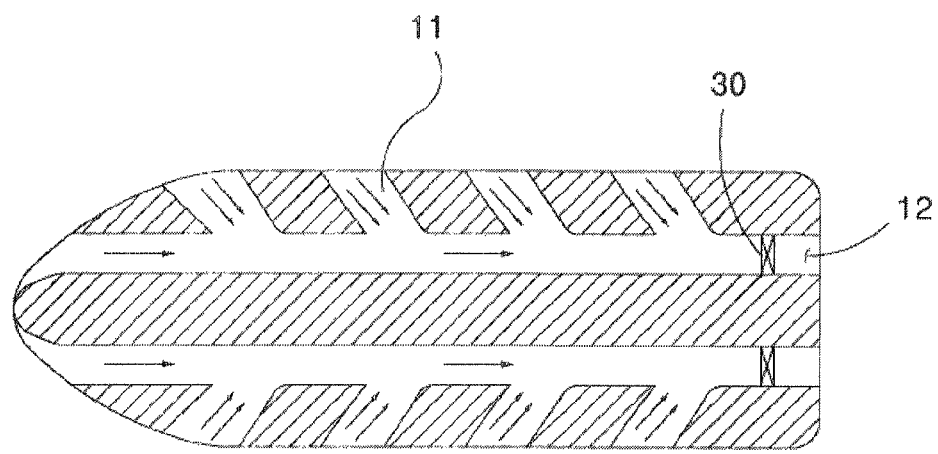
FIG. 4 is a view of further another example of a power generation air flow path according to the present invention.
Figure 5:
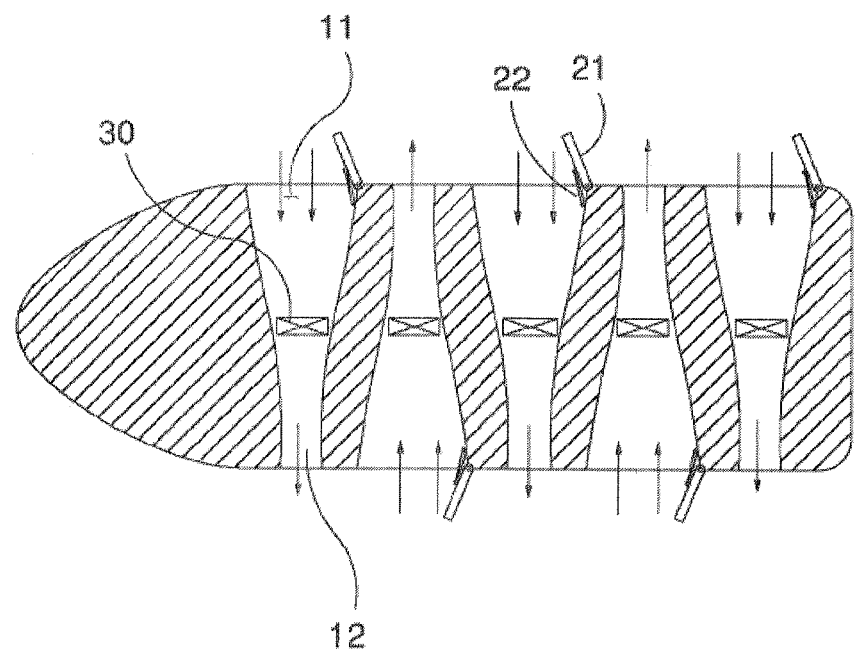
FIG. 5 is a view of a cross wind guide wing according to the present invention.
Figure 6:
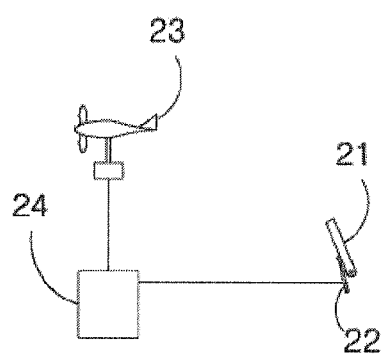
FIG. 6 is a view of major control parts of a cross wind guide wing according to the present invention.

The preferred embodiments of the present invention will be described with reference to the accompanying drawings.

The smart ship according to the present invention is basically directed to generating electric power by using a cross wind while minimizing a cross wind resistance of a ship.

A ship, of which bow and stern portions are configured in a streamline shape, is equipped with a cross wind power generator configured to generate an electric power by using a cross wind in a ship.

The cross wind power generator is equipped with a power generation air path 10 consisting of a cross wind input part 11 formed in at least one portion of a side of a ship for receiving a cross wind, and a cross wind discharging part 12 formed in the other side of the ship for discharging a cross wind inputted through the cross wind input part 11, and a cross wind power generator 30 which is rotated by means of a cross wind inputted through the power generation air path 10 for thereby generating an electric power.

It is preferred that the cross wind input part 11 is formed of a tube of which an inlet part is wider and an outlet part is smaller for thereby increasing an air pressure by receiving a lot of air.

In another embodiment of the present invention, a cross wind guide wing 21 is provided for effectively guiding a cross wind into the cross wind input part 11, which cross wind is inputted at a certain inclined angle with respect to a ship. A driving actuator 22 is provided for rotating the cross wind guide wing 21 depending on an input angle of a cross wind. A cross wind angle detection part 23 is provided for detecting an input angle of the cross wind. A cross wind cross part 24 is provided for driving the driving actuator 22 depending on a cross wind angle detected by the cross wind angle detection part 23.

In the embodiment of the present invention, the cross wind input part 11 is inclined from a bow portion to a stern portion and then is gathered at its center, and it is preferred that a cross wind discharging part 12 is formed in a center portion where the cross wind input part 11 is gathered, while being connected from a stern portion to a bow portion.

The cross wind input part 11 is inclined from a bow portion to a stern portion. The cross wind discharging part 12 is connected from a bow portion to a stern portion for thereby gathering the air inputted into the cross wind input part 11 formed at both sides.

In the embodiment of the present invention, it is preferred that a cross wind input part 11 and a cross wind discharging part 12 are formed in a zigzag shape from a bow portion to a stern portion.

The operation of a smart ship according to the present invention will be described.

The ship, of which bow and stern portions are configured in a streamline shape, is equipped with a cross wind power generator configured to generate an electric power by using a cross wind in a ship. The cross wind power generator is equipped with a power generation air path 10 consisting of a cross wind input part 11 formed in at least one portion of a side of a ship for receiving a cross wind, and a cross wind discharging part 12 formed in the other side of the ship for discharging a cross wind inputted through the cross wind input part 11, and a cross wind power generator 30 which is rotated by means of a cross wind inputted through the power generation air path 10 for thereby generating an electric power. In the thusly configured smart ship according to the present invention, a cross wind applied to a ship is absorbed into the ship power generation air path 10, so a resistance with respect to a cross wind is decreased for thereby minimizing a cross wind resistance. The cross wind inputted into a power generation air path drives a cross wind power generator 30 for thereby generating electric power. The thusly generated electric power can be used for sailing a ship or for an internal use of a ship, so that it is possible to minimize the consumption of an energy which is used for sailing.

INDUSTRIAL APPLICABILITY

As described above, the smart ship according to the present invention is basically equipped with a cross wind power generator for thereby preventing a cross wind resistance and generating an electric power by using a cross wind. The generated electric power can be used for sailing a ship and for an internal use of a ship, which results in enhancing a sailing efficiency of a ship.

The present invention can be effectively applied to a large size ship or a super large size ship such as an oil tanker or a gas carrier, a container carrier, a bulk carrier and an aircraft carrier which has more than 40~80 m wide, 300~460 m long and 10~30 capacity tonnage, so the area exposed from her side surface is very large, and the ship has a relatively larger cross wind resistance in the course of sailing. So it is possible to prevent a fuel loss by minimizing an air resistance, and a lot of cross wind can be used for generating an electric power, and the generated electric power can be used for sailing and for an internal use of a ship. A non-fuel sailing operation can be extended in the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A smart ship, comprising:
    a ship having a bow portion and a stern portion formed in a streamline shape;
    a first side and a second side of the ship, at least one of the first side and the second side of the ship extending from the bow portion to the stern portion;
    a power generation air path comprising a cross wind input port formed in at least one portion of the first side of the ship receiving a cross wind, and a cross wind discharging port formed in the second side of the ship discharging the cross wind received through the cross wind input port; and
    a cross wind power generator disposed in the power generation air path and generating electric power in response to the cross wind flowing through the power generation air path,
    said cross wind input port formed of a tube of which an inlet port is wider than an outlet port disposed to increase pressure along the power generation air path, said cross wind input port comprised of:
    a cross wind angle detector disposed to indicate an input angle of the cross wind;
    a cross wind guide wing diverting the cross wind to an inclined angle with respect to the ship into the cross wind input port; and
    a driving actuator rotating the cross wind guide wing to the inclined angle in correspondence with the input angle indicated by the cross wind angle detector.

2. The smart ship of claim 1, wherein the cross wing input port is inclined from the bow portion to the stern portion of the ship and is configured either with the cross wind discharging port connected from the bow portion to the stern portion of the ship along a center portion of the ship, or the cross wind discharging port is connected from the bow portion to the stern portion of the ship.

3. The smart ship of claim 1, wherein said cross wind input port and said cross wind discharging port are alternately arranged along the first and second sides of the ship from the bow portion to the stern portion of the ship.

* * * * *